(12) United States Patent
Zhang (10) Patent No.: US 12,518,775 B2
(45) Date of Patent: Jan. 6, 2026

(54) SOUND QUALITY EVALUATION METHOD AND APPARATUS, AND DEVICE

(71) Applicant: Tencent Music Entertainment Technology (Shenzhen) Co., Ltd., Shenzhen (CN)

(72) Inventor: Chaopeng Zhang, Shenzhen (CN)

(73) Assignee: Tencent Music Entertainment Technology (Shenzhen) Co., Ltd., Shenzhen (CN)

( * ) Notice: Subject to any disclaimer, the term of this patent is extended or adjusted under 35 U.S.C. 154(b) by 294 days.

(21) Appl. No.: 18/031,849

(22) PCT Filed: Sep. 22, 2021

(86) PCT No.: PCT/CN2021/119540
§ 371 (c)(1),
(2) Date: May 17, 2023

(87) PCT Pub. No.: WO2022/078164
PCT Pub. Date: Apr. 21, 2022

(65) Prior Publication Data
US 2023/0386503 A1    Nov. 30, 2023

(30) Foreign Application Priority Data
Oct. 14, 2020   (CN) ................... 202011095947.7

(51) Int. Cl.
*G10L 25/60*     (2013.01)
*G06T 5/73*      (2024.01)
(Continued)

(52) U.S. Cl.
CPC ............. *G10L 25/60* (2013.01); *G06T 5/73* (2024.01); *G06T 7/13* (2017.01); *G10L 21/10* (2013.01)

(58) Field of Classification Search
CPC . G10L 25/60; G10L 21/10; G06T 7/13; G06T 5/73
See application file for complete search history.

(56) References Cited

U.S. PATENT DOCUMENTS

| 7,013,266 B1 | 3/2006 | Berger |
| 9,679,579 B1 * | 6/2017 | Lyon ................. G10L 25/51 |

(Continued)

FOREIGN PATENT DOCUMENTS

| CA | 2148340 C | 12/2004 |
| CN | 105489228 A | 4/2016 |

(Continued)

OTHER PUBLICATIONS

First Office Action for Chinese Application No. 202011095947.7, dated Apr. 12, 2023.
(Continued)

*Primary Examiner* — Bhavesh M Mehta
*Assistant Examiner* — Eunice Lee
(74) *Attorney, Agent, or Firm* — Wolf, Greenfield & Sacks, P.C.

(57) ABSTRACT

A method and an apparatus for evaluating voice quality are provided. In the method, a playback of a standard audio is recorded to obtain a to-be-evaluated signal. Then a first power spectrum of the to-be-evaluated signal on a critical frequency band is determined to obtain a first spectrogram. Then a second power spectrum of a reference signal corresponding to the standard audio on a critical frequency band is determined to obtain a second spectrogram, where the reference signal is a sampled signal corresponding to the standard audio. Then an image similarity between the first spectrogram and the second spectrogram is determined to obtain a voice quality score of the to-be-evaluated signal.

9 Claims, 8 Drawing Sheets

(51) Int. Cl.
    *G06T 7/13*          (2017.01)
    *G10L 21/10*       (2013.01)

(56)                References Cited

U.S. PATENT DOCUMENTS

| | | | |
|---|---|---|---|
| 10,373,623 B2* | 8/2019 | Dittmar | G10L 19/03 |
| 2015/0039640 A1* | 2/2015 | Garrett | G06F 16/683 |
| | | | 707/758 |
| 2018/0293995 A1* | 10/2018 | Makela | G10L 21/0208 |
| 2018/0317876 A1* | 11/2018 | Emmanouilidou | G16H 40/63 |
| 2019/0122698 A1* | 4/2019 | Iyer | H04H 60/33 |
| 2021/0158832 A1 | 5/2021 | Yang et al. | |
| 2021/0335378 A1* | 10/2021 | Liang | G10L 19/24 |

FOREIGN PATENT DOCUMENTS

| | | | | |
|---|---|---|---|---|
| CN | 107481734 A | | 12/2017 | |
| CN | 108615006 A | * | 10/2018 | G06F 18/22 |
| CN | 110853664 A | | 2/2020 | |
| CN | 111710348 A | | 9/2020 | |
| CN | 112233693 A | | 1/2021 | |
| DE | 198 40 548 A1 | | 3/2000 | |
| WO | WO-2013006175 A1 | * | 1/2013 | G10L 19/025 |

OTHER PUBLICATIONS

International Search Report and Written Opinion for International Application No. PCT/CN2021/119540, mailed Dec. 22, 2021.

* cited by examiner

SOUND QUALITY EVALUATION METHOD AND APPARATUS, AND DEVICE

This application is a national stage filing under 35 U.S.C. § 371 of International Patent Application No. PCT/CN2021/119540, filed on Sep. 22, 2021, which claims priority to Chinese Patent Application No. 202011095947.7, titled "SOUND QUALITY EVALUATION METHOD AND APPARATUS, AND DEVICE", filed on Oct. 14, 2020 with the China National Intellectual Property Administration. The contents of these applications are incorporated herein by reference in their entireties.

FIELD

The present disclosure relates to the technical field of audio quality evaluation, and in particular to a method and an apparatus for evaluating voice quality, and a device.

BACKGROUND

In the conventional technology, the perceptual evaluation of speech quality (PESQ) method is widely used in the field of voice quality evaluation with references. However, the PESQ method is usually applied in the network communication of Voice over Internet Protocol (VOIP), to mainly evaluate issues such as time misalignment and spectral distortion caused by frame loss and jitter during network transmission of audio signals. Due to multiple iterations of alignment processing in the PESQ method and the complex process of the parameter filtering algorithm, it takes a long time to evaluate the voice quality of an audio signal. In addition, the sampling frequency band of the PESQ method is limited, which can only support a sampling rate less than 16 kHz. As a result, it is difficult to evaluate a signal having a wide frequency band. In a word, it is found that the conventional technology at least has the problems of slow evaluation of voice quality and high limitation on the sampling rate.

SUMMARY

In view of this, an object of the present disclosure is to provide a method and an apparatus for evaluating voice quality and a device, so as to lower the complexity of the voice quality evaluation algorithm, thereby improving the efficiency of voice quality evaluation without any requirement for the audio sampling rate. The solution is described as follows.

In a first aspect, a method for evaluating voice quality is provided according to the present disclosure, including:
  recording a playback of a standard audio to obtain a to-be-evaluated signal;
  determining a first power spectrum of the to-be-evaluated signal on a critical frequency band to obtain a first spectrogram;
  determining a second power spectrum of a reference signal corresponding to the standard audio on a critical frequency band to obtain a second spectrogram; where, the reference signal is a sampled signal corresponding to the standard audio; and
  determining an image similarity between the first spectrogram and the second spectrogram, obtain a voice quality score of the to-be-evaluated signal.

In an embodiment, the determining the image similarity between the first spectrogram and the second spectrogram includes:
  performing image enhancement on each of the first spectrogram and the second spectrogram, to obtain a first enhanced image corresponding to the first spectrogram and a second enhanced image corresponding to the second spectrogram; and
  determining an image similarity between the first enhanced image and the second enhanced image.

In an embodiment, the performing the image enhancement on each of the first spectrogram and the second spectrogram includes: sharpening the first spectrogram and the second spectrogram; and
  the determining the image similarity between the first enhanced image and the second enhanced image includes: calculating a cosine similarity between the first enhanced image and the second enhanced image.

In an embodiment, the performing the image enhancement on each of the first spectrogram and the second spectrogram includes: performing edge detection on each of the first spectrogram and the second spectrogram; and
  the determining the image similarity between the first enhanced image and the second enhanced image includes: calculating a Hamming distance or a cosine similarity between the first enhanced image and the second enhanced image.

In an embodiment, before the determining the first power spectrum of the to-be-evaluated signal on the critical frequency band to obtain the first spectrogram; determining the second power spectrum of the reference signal corresponding to the standard audio on the critical frequency band to obtain the second spectrogram, the method further includes: removing mute segments from the to-be-evaluated signal and the reference signal.

In an embodiment, the removing the mute segments from the to-be-evaluated signal and the reference signal includes:
  determining a first logarithmic power spectrum corresponding to the to-be-evaluated signal and a second logarithmic power spectrum corresponding to the reference signal;
  determining, in the first logarithmic power spectrum, a segment having a decibel value less than a preset threshold as a first mute segment;
  determining, in the second logarithmic power spectrum, a segment having a decibel value less than the preset threshold as a second mute segment; and
  removing the first mute segment from the to-be-evaluated signal and removing the second mute segment from the reference signal.

In an embodiment, after the recording the playback of the standard audio to obtain the to-be-evaluated signal, the method further includes:
  normalizing the to-be-evaluated signal and the reference signal.

In an embodiment, the method for evaluating voice quality further includes: optimizing the first power spectrum and the second power spectrum based on a masking effect.

In a second aspect, an apparatus for evaluating voice quality is provided according to the present disclosure, including:
  a to-be-evaluated signal acquisition module, configured to record a playback of a standard audio to obtain a to-be-evaluated signal;
  a first spectrogram acquisition module, configured to determine a first power spectrum of the to-be-evaluated signal on a critical frequency band to obtain a first spectrogram;
  a second spectrogram acquisition module, configured to determine a second power spectrum of a reference signal corresponding to the standard audio on a critical frequency band to obtain a second spectrogram, where the reference signal is a sampled signal corresponding to the standard audio; and a voice quality score determination module, configured to determine an image similarity between the first spectrogram and the second spectrogram, to obtain a voice quality score of the to-be-evaluated signal.

In a third aspect, an electronic device is provided according to the present disclosure, the electronic device includes:

a memory, configured to store a computer program; and a processor, configured to execute the computer program, to perform the above method for evaluating voice quality.

In a fourth aspect, a computer readable store medium is provided according to the present disclosure, the computer readable store medium is configured to store a computer program, when the computer program is executed by a processor, the above method for evaluating voice quality is implemented.

It can be seen that, in the present disclosure, the playback of the standard audio is firstly recorded to obtain the to-be-evaluated signal. Then the first power spectrum of the to-be-evaluated signal on the critical frequency band is determined to obtain the first spectrogram, and the second power spectrum of the reference signal corresponding to the standard audio on the critical frequency band is determined to obtain a second spectrogram, where the reference signal is a sampled signal corresponding to the standard audio. Subsequently, an image similarity between the first spectrogram and the second spectrogram is determined, to obtain a voice quality score of the to-be-evaluated signal. In other words, in the present disclosure, the similarity between the power spectrums of the to-be-evaluated signal and the reference signal on the respective critical frequency bands is determined by means of determining the image similarity to obtain the voice quality score of the to-be-evaluated signal. In this way, the complexity of the voice quality evaluation algorithm can be reduced, thereby improving the processing speed of voice quality evaluation without any requirement for the audio sampling rate.

BRIEF DESCRIPTION OF THE DRAWINGS

In order to more clearly explain the technical solutions in the embodiments of the present disclosure or in the conventional technology, the drawings used in the description of the embodiments or the conventional technology are briefly introduced hereinafter. It is apparent that the drawings in the following description illustrate only some embodiments of the present disclosure. Other drawings may be obtained by those skilled in the art without creative efforts based on the provided drawings.

DETAILED DESCRIPTION OF EMBODIMENTS

The following will clearly and completely describe the technical solutions in the embodiments of the present disclosure with reference to the accompanying drawings in the embodiments of the present disclosure. Obviously, the described embodiments are only some embodiments, rather than all embodiments of the present disclosure. Based on the embodiments of the present disclosure, all other embodiments obtained by the skilled in the art without making creative efforts belong to the protection scope of the present disclosure.

Although the PESQ method is widely used in the field of voice quality evaluation with references, the PESQ method is usually applied in the network communication of VOIP, to mainly evaluate issues such as time misalignments and spectral distortions caused by frame loss and jitter during network transmission of audio signals. Due to multiple iterations of alignment processing in the PESQ method and the complex process of the parameter filtering algorithm, it takes a long time to evaluate the voice quality of an audio signal. In addition, the sampling frequency band of the PESQ method is limited, which can only support a sampling rate less than 16 kHz. As a result, it is difficult to evaluate a signal having a wide frequency band. To this end, a solution for evaluating voice quality is provided according to the present disclosure, which has no requirement on the audio sampling rate, and can lower the complexity of the voice quality evaluation algorithm, thereby increasing the speed of voice quality evaluation.

Figure 1:
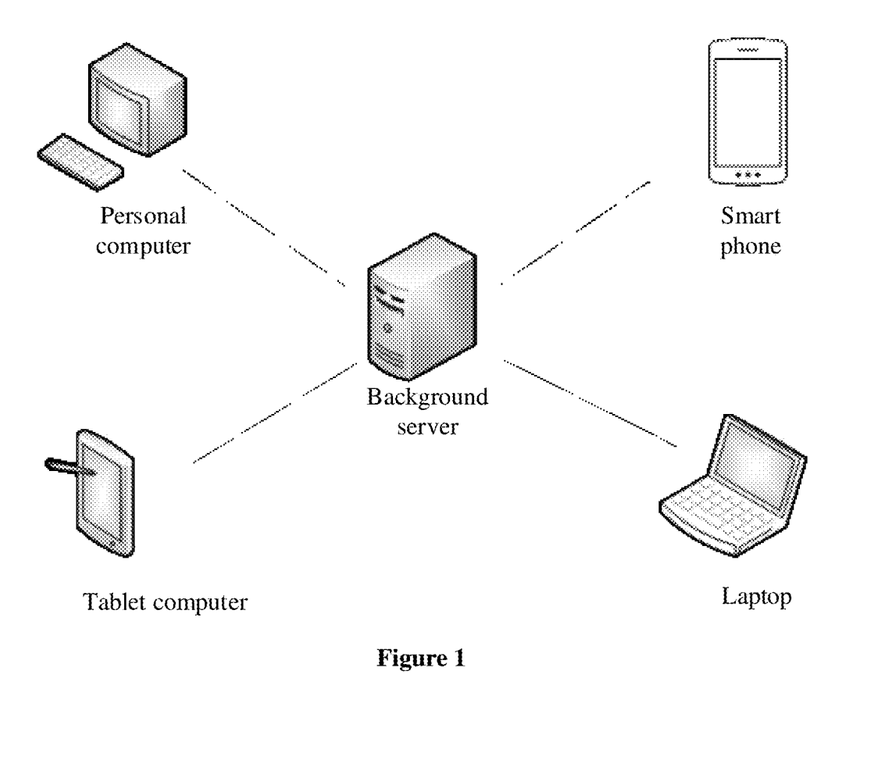
FIG. 1 is a schematic diagram of a system framework applicable to a voice quality evaluation solution according to an embodiment of the present disclosure.

In the solution for evaluating voice quality of the present disclosure, a system framework may be as shown in FIG. 1. The system framework may include a background server and multiple voice collecting devices having communication connections with the background server. The voice collecting devices include, but are not limited to, tablet computers, laptops, smart phones, personal computers (PCs) or other professional devices, which are not limited here.

In the present disclosure, a voice collecting device is used to record, in a recording studio, a playback of a standard audio to obtain a to-be-evaluated signal. Then, the obtained to-be-evaluated signal is transmitted to the server. The steps performed by the server include: determining a first power spectrum of the to-be-evaluated signal on a critical frequency band to obtain a first spectrogram; determining a second power spectrum of a reference signal corresponding to the standard audio on a critical frequency band to obtain a second spectrogram, where the reference signal is a sampled signal corresponding to the standard audio; and determining an image similarity between the first spectrogram and the second spectrogram, to obtain a voice quality score of the to-be-evaluated signal.

The standard audio is played by a professional playback device. The standard audio is obtained in advance by a professional recording device in a recording studio.

In some other specific implementations, after obtaining the to-be-evaluated signal, the voice collecting device may determine a first power spectrum of the to-be-evaluated signal on a critical frequency band to obtain a first spectrogram, determine a second power spectrum of a reference signal corresponding to the standard audio on a critical frequency band to obtain a second spectrogram, where the reference signal is a sampled signal corresponding to the standard audio; and determine an image similarity between the first spectrogram and the second spectrogram, to obtain a voice quality score of the to-be-evaluated signal.

According to the present disclosure, the method for evaluating voice quality can be specifically applied to a scene of evaluating a recording system of a voice collecting device. The obtained voice quality score can be used as an evaluation index to evaluate the performance of the recording system of the voice collecting device.

Figure 2:
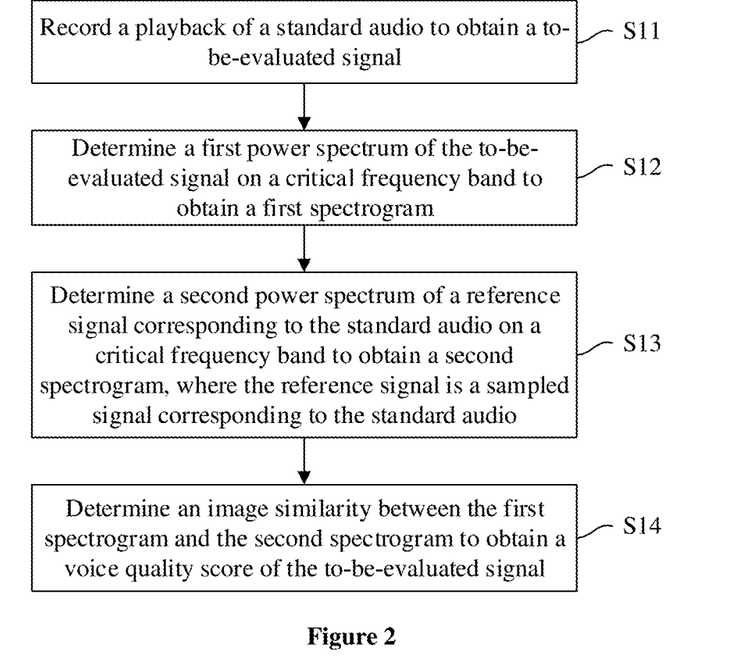
FIG. 2 is a flow chart of a method for evaluating voice quality according to the present disclosure.

Referring to FIG. 2, a method for evaluating voice quality according to the present disclosure includes steps S11 to S14.

In step S11, a playback of a standard audio is recorded to obtain a to-be-evaluated signal.

In step S12, a first power spectrum of the to-be-evaluated signal on a critical frequency band is determined to obtain a first spectrogram.

In step S13, a second power spectrum of a reference signal corresponding to the standard audio on a critical frequency band is determined to obtain a second spectrogram, where the reference signal is a sampled signal corresponding to the standard audio.

In a specific implementation, after the to-be-evaluated signal is obtained, the to-be-evaluated signal and the reference signal are firstly normalized, so that the to-be-evaluated signal and the reference signal are processed to the same order of magnitude for comparison. The used normalization formula may be:

$$x(i)' = \frac{x(i)}{\max_{i=0,1,2,\ldots}\{|x(i)|\}}$$

where, $x(i)$ represents the signal before being normalized; $x(i)'$ represents the normalized signal; and i represents an index of a sample point in the entire segment of the signal, which values from 0 to the end of the signal.

Further, a short-time Fourier transform (STFT) is performed on each of the to-be-evaluated signal and the reference signal to convert the to-be-evaluated signal and the reference signal to the frequency domain. Then, a first signal power spectrum of the to-be-evaluated signal and a second signal power spectrum of the reference signal are calculated.

In an embodiment, a window having a frame length of 20 ms and a frame shift of is used to perform the STFT, and the longest frame shift is defined as 10 ms. The length T of the window function $w(m)$ is 20 ms. The used window may be a Hanning window or a Hamming window. Each analysis frame signal is converted to the frequency domain by STFT as below:

$$X(k,n) = F\{x_n(m) \cdot w(m)\};$$

where, $X(k, n)$ represents the signal spectrum of the n-th frame at the k-th frequency point; $w(m)$ represents the window function; F represents the Fourier transform; $x_n(m)$ represents the signal sequence of the n-th frame; m represents an index of a sample point in the frame, where $m \in [0, N-1]$; N represents the frame length of the signal.

Then, the first signal power spectrum of the to-be-evaluated signal and the second signal power spectrum of the reference signal are calculated respectively through the equation below:

$$P(k,n) = |X(k,n)|^2$$

Further, the first signal power spectrum and the second signal power spectrum are mapped to the Bark domain respectively, to determine the critical frequency band corresponding to the first signal power spectrum and the critical frequency band corresponding to the second signal power spectrum. Then a first power spectrum of the to-be-evaluated signal on the critical frequency band and a second power spectrum of the reference signal on the critical frequency band are determined.

In an embodiment, the relation between the critical frequency band (bark domain) variable z and the frequency variable f can be defined as follows:

$$z = B(f) = 7 \cdot a \sinh\left(\frac{f}{650}\right), f = B^{-1}(z) = 650 \cdot \sinh\left(\frac{z}{7}\right);$$

The frequency band [80, 16k] Hz of the signal in the bark domain is divided by a bark width $\Delta z = 1.6$ to obtain multiple critical frequency bands. In a case that the sampling rate is less than 32 kHz, the maximum bandwidth fs/2 (fs represents the sampling rate) as the upper limit of the frequency band for bark domain mapping. Then, the frequency (f), bark (z), upper and lower frequency limits and the center frequency are calculated for each critical frequency band. Subsequently, the upper and lower frequency limits and the center frequency are mapped back to the frequency domain to calculate the power spectrum of each critical frequency band in the frequency domain through the equation below:

$$P_b(j, n) = \sum_{k=I_l(j)}^{I_u(j)} P_x(k, n)$$

where, $P_b(j, n)$ represents the power of the j-th critical frequency band in the n-th frame; $P_x(k, n)$ represents the power of the k-th frequency point in the n-th frame; $I_l(j)$ and $I_u(j)$ respectively represent the lower limit frequency point and upper limit frequency point of the j-th critical frequency band.

In this way, the first power spectrum of the to-be-evaluated signal on the critical frequency band and the second power spectrum of the reference signal on the critical frequency band are calculated. Then, the first power spectrum and the second power spectrum are converted into logarithmic power spectrums respectively. Subsequently, images corresponding to the logarithmic power spectrums are generated to obtain a first spectrogram and a second spectrogram.

In addition, in some embodiments, the first power spectrum and the second power spectrum may be optimized based on a masking effect.

The sensitivity of human ears to different frequencies can be simulated based on the auditory system characteristics. The power spectrums of the to-be-evaluated signal and the reference signal on the critical frequency bands can be further optimized based on the spectral time-frequency masking, so as to better simulate the auditory perception characteristics, thereby improving the accuracy of the scoring result.

In step S14, an image similarity between the first spectrogram and the second spectrogram is determined, to obtain a voice quality score of the to-be-evaluated signal.

It can be seen that, in the embodiment of the present disclosure, the playback of the standard audio is firstly recorded to obtain the to-be-evaluated signal. Then the first power spectrum of the to-be-evaluated signal on the critical frequency band is determined to obtain the first spectrogram, and the second power spectrum of the reference signal corresponding to the standard audio on the critical frequency band is determined to obtain a second spectrogram, where the reference signal is a sampled signal corresponding to the standard audio. Subsequently, an image similarity between the first spectrogram and the second spectrogram is determined, to obtain a voice quality score of the to-be-evaluated signal. In other words, in the embodiment of the present disclosure, the similarity between the power spectrums of the to-be-evaluated signal and the reference signal on the respective critical frequency bands is determined by means of determining the image similarity to obtain the voice quality score of the to-be-evaluated signal. In this way, the complexity of the voice quality evaluation algorithm can be reduced, thereby improving the processing speed of voice quality evaluation without any requirement for the audio sampling rate.

Figure 3:
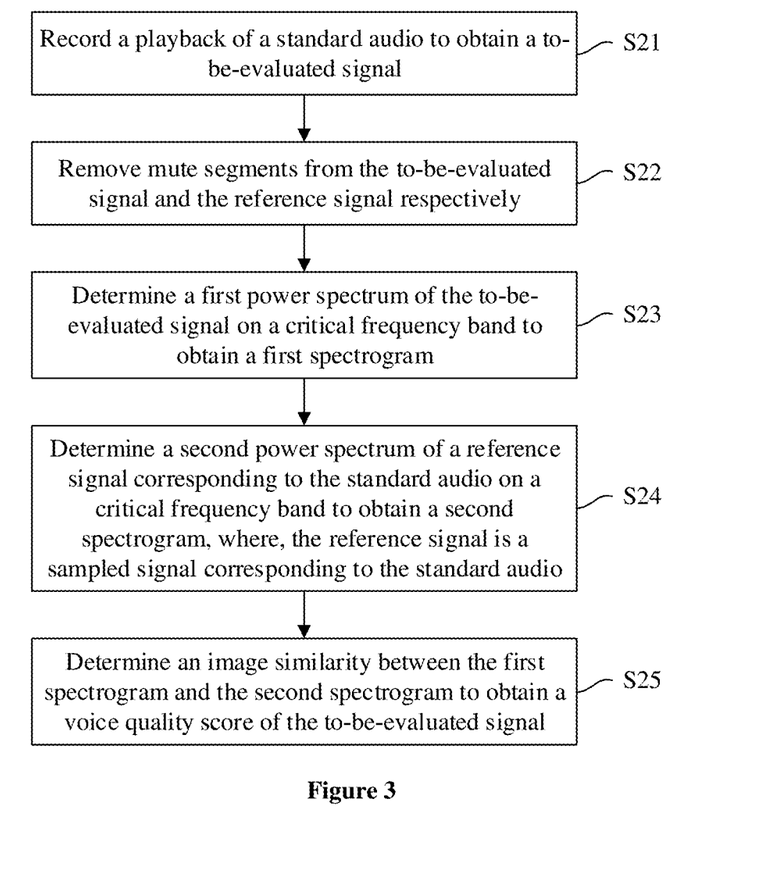
FIG. 3 is a flow chart of a method for evaluating voice quality according to the present disclosure.

Referring to FIG. 3, a method for evaluating voice quality is provided according to an embodiment of the present disclosure, which includes the following steps S21 to S25.

In step S21, a playback of a standard audio is recorded to obtain a to-be-evaluated signal.

In step S22, mute segments are removed from the to-be-evaluated signal and the reference signal.

In a specific implementation, a first logarithmic power spectrum corresponding to the to-be-evaluated signal and a second logarithmic power spectrum corresponding to the reference signal are determined. A segment having a decibel value less than a preset threshold in the first logarithmic power spectrum is determined as a first mute segment. A segment having a decibel value less than the preset threshold in the second logarithmic power spectrum is determined as a second mute segment. The first mute segment is removed from the to-be-evaluated signal and the second mute segment is removed from the reference signal.

Specifically, the first logarithmic power spectrum and the second logarithmic power spectrum may be respectively calculated based on the first signal power spectrum and the second signal power spectrum, so as to convert the power values into decibel values. For the calculation of the first signal power spectrum and the second signal power spectrum, reference may be made to the description of the foregoing embodiments, details of which are not repeated here.

In a specific implementation, the power of each frame of the to-be-evaluated signal and the reference signal can be calculated based on the first signal power spectrum and the second signal power spectrum through the equation below:

$$P(n) = \frac{1}{K}\sum_{k=0}^{K-1} P(k, n);$$

where K represents the total number of frequency points.

Further, the first logarithmic power spectrum and the second logarithmic power spectrum are calculated through the equation below:

$$PdB(n) = 10 \log_{10}^{P(n)}$$

In addition, in this embodiment, the preset threshold may be determined based on $$PdBthr = \max\left\{-40, \max_{n=0,1,\ldots}\{PdB(n)\} - 40\right\}.$$

In a case that a frame n meets PdB(n)<PdBthr, the frame is determined as a mute frame, which may be removed from the first signal power spectrum or the second signal power spectrum.

In step S23, a first power spectrum of the to-be-evaluated signal on the critical frequency band is determined to obtain a first spectrogram.

In step S24, a second power spectrum of a reference signal corresponding to the standard audio on a critical frequency band is determined to obtain a second spectrogram, where the reference signal is a sampled signal corresponding to the standard audio.

In step S25, an image similarity between the first spectrogram and the second spectrogram is determined, to obtain a voice quality score of the to-be-evaluated signal.

It can be seen that, in this embodiment, the mute segments are removed from the to-be-evaluated signal and the reference signal based on the logarithmic power spectrums of the signal. In this way, the interference of the mute segments on the voice quality evaluation can be avoided, thereby improving the robustness of the voice quality evaluation.

Figure 4:
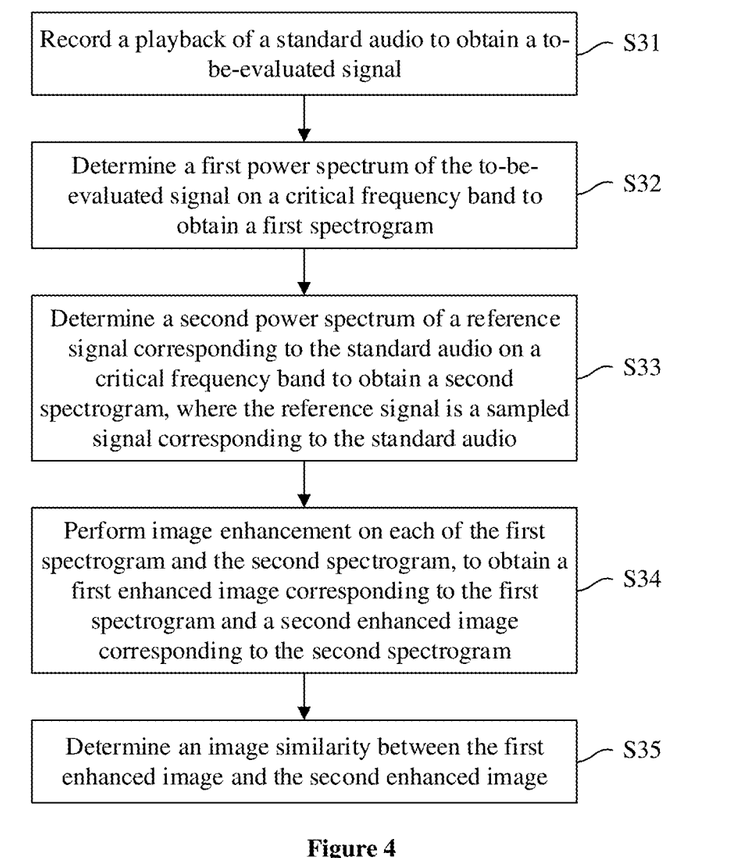
FIG. 4 is a flow chart of a method for evaluating voice quality according to the present disclosure.

Referring to FIG. 4, a method for evaluating voice quality is provided according to an embodiment of the present disclosure, which includes the following steps S31 to S35.

In step S31, a playback of a standard audio is recorded to obtain a to-be-evaluated signal.

In step S32, a first power spectrum of the to-be-evaluated signal on the critical frequency band is determined to obtain a first spectrogram.

In step S33, a second power spectrum of a reference signal corresponding to the standard audio on a critical frequency band is determined to obtain a second spectrogram, where the reference signal is a sampled signal corresponding to the standard audio.

In step S34, image enhancement is performed on each of the first spectrogram and the second spectrogram, to obtain a first enhanced image corresponding to the first spectrogram and a second enhanced image corresponding to the second spectrogram.

In step S35, an image similarity between the first enhanced image and the second enhanced image is determined.

In a specific implementation, the first spectrogram and the second spectrogram may be sharpened respectively, and then a cosine similarity between the first enhanced image and the second enhanced image is calculated.

The first spectrogram and the second spectrogram may be respectively convolved by using a sharpening convolution kernel, so as to realize the sharpening of the first spectrogram and the second spectrogram. For example, two-dimensional convolution is performed on each of the first spectrogram and the second spectrogram by using a 3-order Laplacian sharpening matrix to obtain the sharpened first spectrogram and the sharpened second spectrogram. The 3-order Laplacian sharpening matrix is as follows:

$$\begin{bmatrix} 0 & -1 & 0 \\ -1 & 4 & -1 \\ 0 & -1 & 0 \end{bmatrix}$$

The two-dimensional convolution is expressed as follows:

$$SP_b(j, n) = \sum_{m_1=0}^{M_1} \sum_{m_2=0}^{M_2} h(m_1, m_2) \cdot \log(P_b(j - m_1, n - m_2));$$

where $SP_b(j, n)$ represents the sharpened logarithmic power spectrum of the j-th critical frequency band in the n-th frame; $M_1$ and $M_2$ respectively represent the number of rows and the number of columns of the convolution kernel. In this embodiment, $M_1=M_2=3$.

Further, in this embodiment, the cosine similarity of each frame in the first enhanced image and the second enhanced image may be calculated, and then the average value is determined as the voice quality score of the to-be-evaluated signal.

The cosine similarity is calculated through the following equation:

$$SIM(n) = \frac{\sum_{j=1}^{J}(SP_b^{ref}(j, n) \cdot SP_b^{test}(j, n))}{\sqrt{\sum_{j=1}^{J}(SP_b^{ref}(j, n))^2} \cdot \sqrt{\sum_{j=1}^{J}(SP_b^{test}(j, n))^2}};$$

where, SIM (n) represents the cosine similarity of the n-th frame, $SP_b^{ref}(j, n)$ represents the sharpened power spectrum of the j-th critical frequency band in the n-th frame of the reference signal, and $SP_b^{test}(j, n)$ represents the sharpened power spectrum of the j-th critical frequency band in the n-th frame of the to-be-evaluated signal; and J represents the number of the critical frequency bands.

Then, the average value of the similarities of all frames is determined as the final similarity result, that is, the voice quality score of the to-be-evaluated signal is:

$$\text{score} = \frac{1}{N}\sum_{n=0}^{N-1} SIM(n);$$

where N represents the number of frames, that is, the length of the signal.

Figure 5:
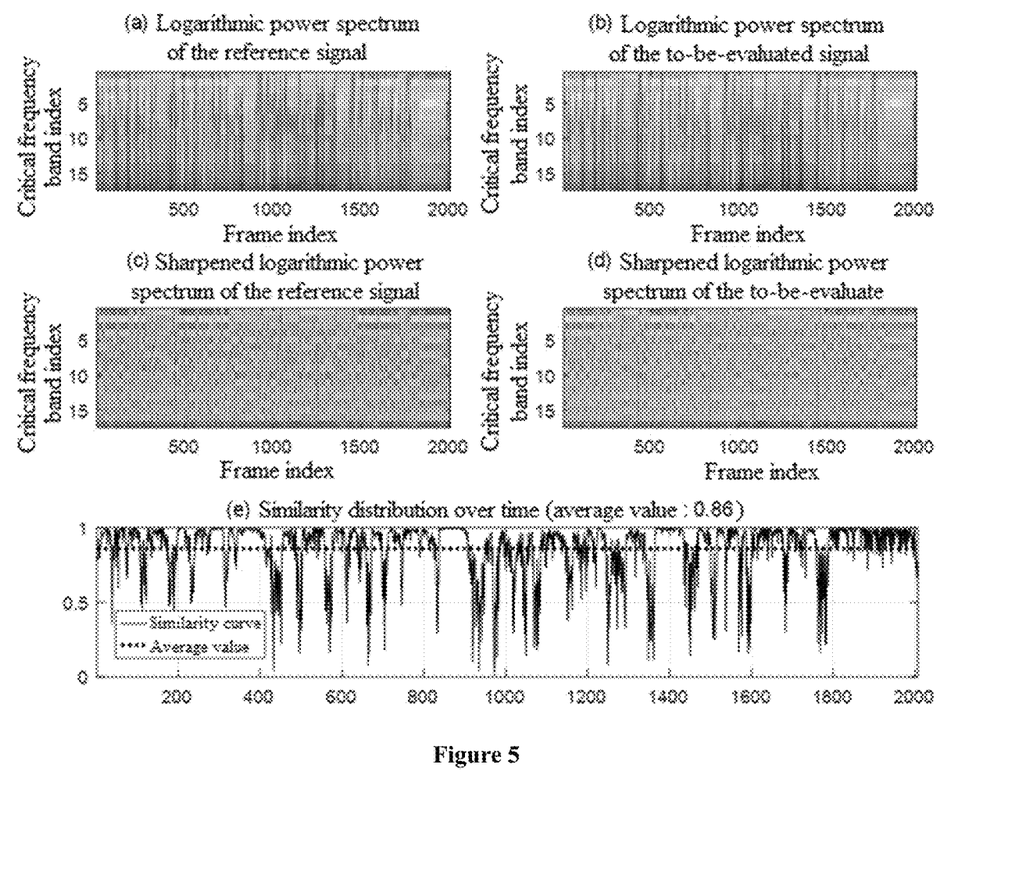
FIG. 5 is a schematic diagram of power spectrum comparison and similarity distribution of a high-quality to-be-evaluated signal and a reference signal on the critical frequency band according to the present disclosure.

Referring to FIG. 5, a schematic diagram of power spectrum comparison and similarity distribution of a high-quality to-be-evaluated signal and a reference signal on the critical frequency bands is provided according to an embodiment of the present disclosure. The similarity between the to-be-evaluated signal and the reference signal is 0.86.

Figure 6:
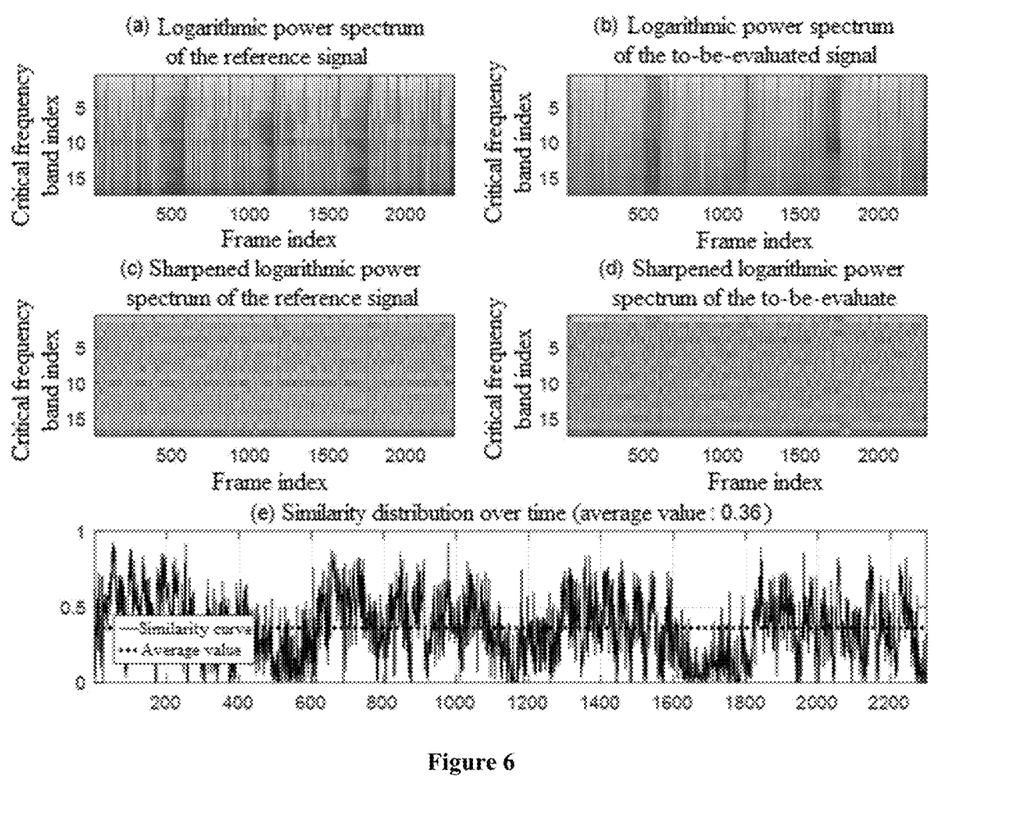
FIG. 6 is a schematic diagram of power spectrum comparison and similarity distribution of a low-quality to-be-evaluated signal and a reference signal on the critical frequency band according to the present disclosure.

Referring to FIG. 6, a schematic diagram of power spectrum comparison and similarity distribution of a low-quality to-be-evaluated signal and a reference signal on the critical frequency bands is provided according to an embodiment of the present disclosure. The similarity between the to-be-evaluated signal and the reference signal is 0.36.

In addition, when performing sharpening on the spectrogram, the convolution kernel function is not limited to the aforementioned Laplacian differential matrix. In some embodiments, the scoring accuracy can be improved by changing the sharpening matrix. For example, the shape of the matrix may be changed, which may not be a square matrix, or may be replaced by another two-dimensional differential matrix.

In another specific implementation, edge detection may be performed on each of the first spectrogram and the second spectrogram. Subsequently, a Hamming distance or cosine similarity between the first enhanced image and the second enhanced image may be calculated.

In other words, an edge detection method may be used to obtain an edge matrix of binary distribution in this embodiment. The Hamming distance or cosine similarity may be calculated to obtain the similarity between the to-be-evaluated signal and the reference signal, so as to obtain a more robust voice quality scores.

Figure 7:
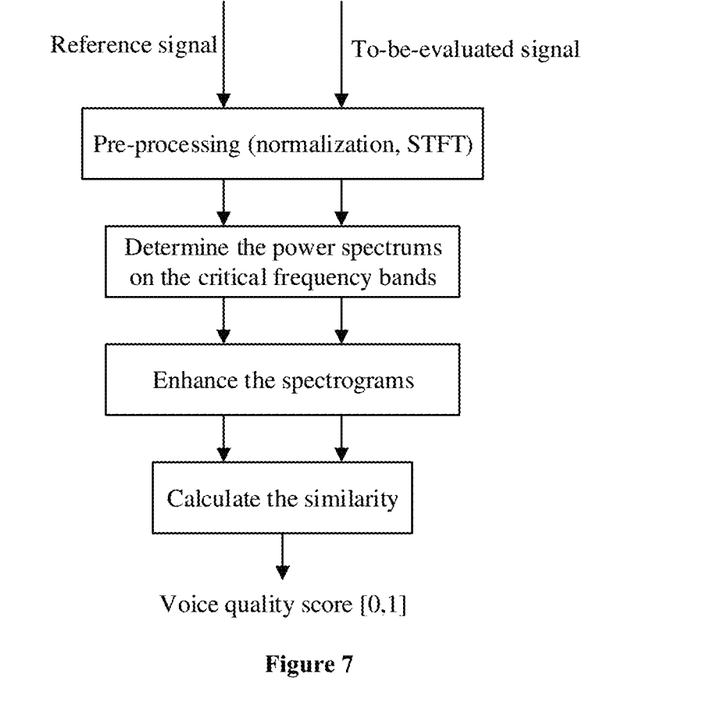
FIG. 7 is a flow chart of a method for evaluating voice quality according to the present disclosure.

For example, referring to FIG. 7, FIG. 7 is a flow chart of a method for evaluating voice quality according to an embodiment of the present disclosure. Pre-processing is performed on each of the to-be-evaluated signal and the reference signal, the pre-processing including normalization and short-time Fourier transform. A first power spectrum of the to-be-evaluated signal on a critical frequency band is determined to obtain a first spectrogram, and a second power spectrum of a reference signal on the critical frequency band is determined to obtain a second spectrogram. Then, spectrogram enhancement is performed. Finally, the image similarity is calculated to obtain the voice quality score of the to-be-evaluated signal, where the voice quality score is in a range of [0, 1].

It can be seen that, in the embodiment of the present disclosure, image enhancement is performed on each of the first spectrogram and the second spectrogram, where the image enhancement may be sharpening or edge detection. Then, the image similarity between the enhanced spectrograms is calculated to obtain the voice quality score of the to-be-evaluated signal. This method can better compare the distribution characteristics of the power spectrums of the to-be-evaluated signal and the reference signal on the respective critical frequency bands, so as to extract the main feature information of the signals, thereby improving the accuracy of the voice quality evaluation results.

Further, in order to test the voice quality evaluation solution provided according to the present disclosure, 161 singing phrases with a sampling rate of 44100 Hz are used as reference signals, and the corresponding to-be-evaluated signals are obtained by processing the reference signals with different degrees of noisy and distortion. The voice quality evaluation solution of the present disclosure and the PESQ method are respectively used to calculate the voice quality score of the to-be-evaluated signals. After normalizing the scoring results obtained by the PESQ method, a comparative analysis is performed. In a specific test, the voice quality evaluation solution of the present disclosure includes: normalizing the to-be-evaluated signal and the reference signal; converting the to-be-evaluated signal and the reference signal to the frequency domain through short-time Fourier transform; determining the first signal power spectrum corresponding to the to-be-evaluated signal and the second signal power spectrum corresponding to the reference signal; removing mute segments from the first signal power spectrum and the second signal power spectrum; mapping the first signal power spectrum and the second signal power spectrum to the bark domain; determining the first power spectrum of the to-be-evaluated signal on the critical frequency band to obtain the first spectrogram, determining the second power spectrum of the reference signal on the critical frequency band to obtain the second spectrogram; sharpening the first spectrogram and the second spectrogram respectively to obtain a first enhanced image corresponding to the first spectrogram and a second enhanced image corresponding to the second spectrogram; and calculating a cosine similarity between the first enhanced image and the second enhanced image to obtain the voice quality score of the to-be-evaluated signal.

In the test, Pearson product-moment correlation coefficient (PPC) and Root Mean Squared Error (RMSE) is used to measure the correlation degree between the objective score and the subjective score.

The PPC calculation equation is as follows:

$$PCC = \frac{\sum_{i=1}^{N}(M_o(i) - \overline{M_o})(M_s(i) - \overline{M_s})}{\sqrt{\sum_{i=1}^{N}(M_o(i) - \overline{M_o})^2 \sum_{i=1}^{N}(M_s(i) - \overline{M_s})^2}}$$

where N represents the number of samples; $M_s(i)$ and $M_o(i)$ are respectively a subjective score (i.e., a manual scoring result) and an objective score (i.e., a scoring result obtained by the algorithm) of the i-th sample. $\overline{M_s}$ and $\overline{M_o}$ are respectively the average values of the subjective scores and the objective scores. The PCC indicates the strength of the linear correlation between the subjective score and the objective score, where a PPC value closer to 1 indicates the objective evaluation result is more accurate.

The RMSE indicates the deviation of subjective score from objective score, which is expressed as follows:

$$RMSE = \sqrt{\frac{1}{N}\sum_{i=1}^{N}(M_o(i) - M_s(i))^2}$$

Figure 8:
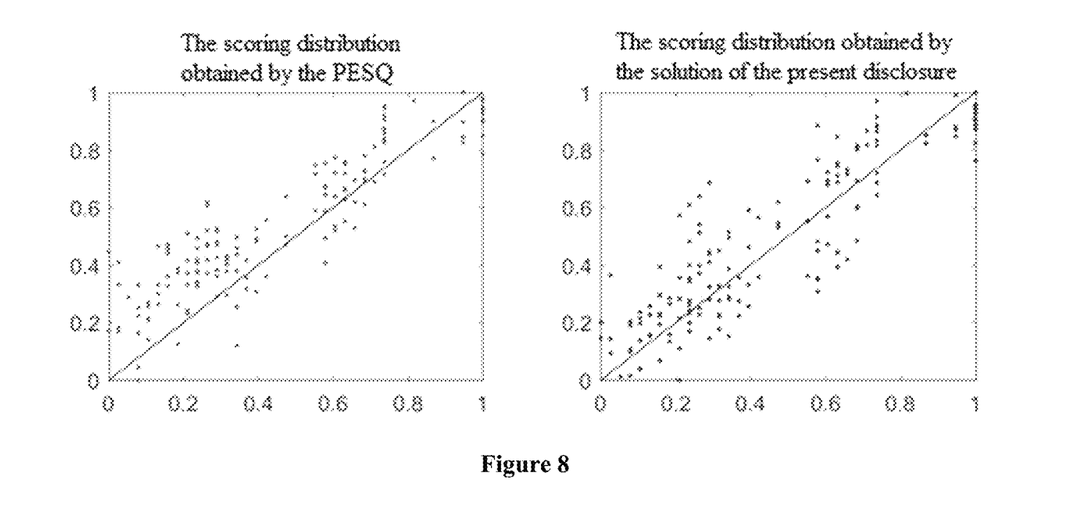
FIG. 8 is a schematic diagram of a comparison between tests on correlation of voice quality scoring according to the present disclosure.

FIG. 8 is a schematic diagram of a comparison of correlation tests of voice quality scoring methods according to an embodiment of the present disclosure.

Table 1 illustrates the statistical results of similarities between subjective scores and objective scores obtained by using the voice quality evaluation solution of the present disclosure and the PESQ method to calculate the voice quality scores of the to-be-evaluated signals.

TABLE 1

|  | PCC | RMSE |
| --- | --- | --- |
| PESQ | 0.908136 | 0.566783 |
| Solution of the present disclosure | 0.887953 | 0.138133 |

Table 1 shows that although the PCC consistency between the objective and subjective scores obtained in the solution of the present disclosure is slightly lower than that of PESQ, the RMSE is better than that of the PESQ.

Table 2 illustrates the time consumption of the solution of the present disclosure and the PESQ for performing the audio scoring of the same 161 sentences when running on a device with i7 processor having a base frequency of 4.2 GHz.

TABLE 2

|  | Time consumption (s) | | | Average time consumption for short audio (audio of 30 s) |
| --- | --- | --- | --- | --- |
|  | 1st test | 2nd test | Average |  |
| PESQ | 225.412204 | 221.439913 | 223.4261 | 1.3877 |
| Solution of the present disclosure | 48.163180 | 47.942813 | 48.0530 | 0.2985 |

Table 2 shows that the time consumption of the solution of the present disclosure is significantly reduced when comparing with the PESQ, which is about 4.6 times shorter than that of the PESQ. That is, the solution of the present disclosure greatly improves the efficiency of voice quality scoring.

The technical solution in the present disclosure will be described below by taking the evaluation of a recording system of a voice collecting device as an example.

In the recording studio, the standard audio "Old Street" is played through a monitor speaker or an artificial mouth, and the playback of the standard audio is recorded to obtain the to-be-evaluated signal. Then the to-be-evaluated signal and the reference signal obtained by sampling the standard audio are respectively normalized. After that, the to-be-evaluated signal and the reference signal are converted to the frequency domain by the short-time Fourier transform. Then, the first signal power spectrum corresponding to the to-be-evaluated signal and the second signal power spectrum corresponding to the reference signal are determined. The mute segments are removed from the first signal power spectrum and the second signal power spectrum. The first signal power spectrum and second signal power spectrum then are mapped to the bark domain. The first power spectrum of the to-be-evaluated signal on the critical frequency band is determined to obtain a first spectrogram, and the second power spectrum of the reference signal on the critical frequency band is determined to obtain the second spectrogram. Subsequently, the first spectrogram and the second spectrogram are sharpened respectively to obtain the first enhanced image corresponding to the first spectrogram and the second enhanced image corresponding to the second spectrogram. Next, the cosine similarity between the first enhanced image and the second enhanced image is calculated to obtain the voice quality score of the to-be-evaluated signal. Alternatively, edge detection is performed on the first spectrogram and the second spectrogram respectively, and the Hamming distance between the first enhanced image and the second enhanced image is calculated to obtain the voice quality score of the to-be-evaluated signal. The obtained voice quality score is then used as an evaluation index to evaluate the recording system of the voice collecting device.

Figure 9:
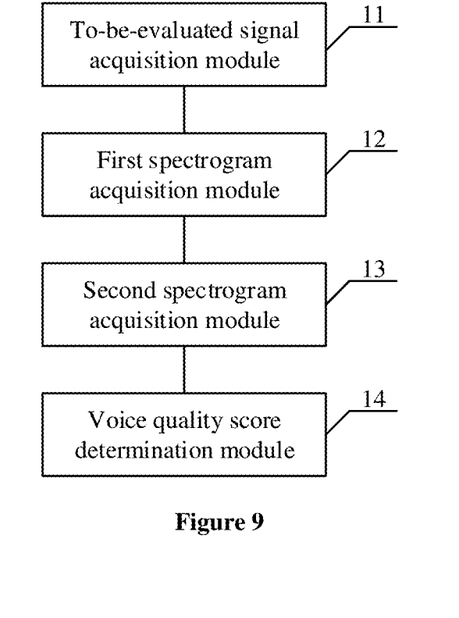
FIG. 9 is a schematic structural diagram of an apparatus for evaluating voice quality according to the present disclosure.

Referring to FIG. 9, an apparatus for evaluating voice quality is provided according to an embodiment of the present disclosure, the apparatus including:
  a to-be-evaluated signal acquisition module 11, configured to record a playback of a standard audio to obtain a to-be-evaluated signal;
  a first spectrogram acquisition module 12, configured to determine a first power spectrum of the to-be-evaluated signal on a critical frequency band to obtain a first spectrogram;
  a second spectrogram acquisition module 13, configured to determine a second power spectrum of a reference signal corresponding to the standard audio on a critical frequency band to obtain a second spectrogram, where the reference signal is a sampled signal corresponding to the standard audio; and a voice quality score determination module 14, configured to determine an image similarity between the first spectrogram and the second spectrogram, to obtain a voice quality score of the to-be-evaluated signal.

In the embodiment of the present disclosure, the playback of the standard audio is firstly recorded to obtain the to-be-evaluated signal. Then the first power spectrum of the to-be-evaluated signal on the critical frequency band is determined to obtain the first spectrogram, and the second power spectrum of the reference signal corresponding to the standard audio on the critical frequency band is determined to obtain a second spectrogram, where the reference signal is a sampled signal corresponding to the standard audio. Subsequently, an image similarity between the first spectrogram and the second spectrogram is determined, to obtain a voice quality score of the to-be-evaluated signal. In other words, in the embodiment of the present disclosure, the similarity between the power spectrums of the to-be-evaluated signal and the reference signal on the respective critical frequency bands is determined by means of determining the image similarity, to obtain the voice quality score of the to-be-evaluated signal. In this way, the complexity of the voice quality evaluation algorithm can be reduced, thereby improving the processing speed of voice quality evaluation without any requirement for the audio sampling rate.

The voice quality score determination module 14 may further include:

an image enhancement unit, configured to perform image enhancement on each of the first spectrogram and the second spectrogram, to obtain a first enhanced image corresponding to the first spectrogram and a second enhanced image corresponding to the second spectrogram; and a similarity calculation unit, configured to determine an image similarity between the first enhanced image and the second enhanced image.

In a specific implementation, the image enhancement unit is further configured to sharpen the first spectrogram and the second spectrogram. Correspondingly, the similarity calculation unit is further configured to calculate a cosine similarity between the first enhanced image and the second enhanced image.

In another specific implementation, the image enhancement unit is further configured to perform edge detection on the first spectrogram and the second spectrogram. Correspondingly, the similarity calculation unit is further configured to calculate a Hamming distance or a cosine similarity between the first enhanced image and the second enhanced image.

In addition, the apparatus for evaluating voice quality may further include a mute segment removal module, configured to remove mute segments from the to-be-evaluated signal and the reference signal.

In a specific implementation, the mute segment removal module includes:

a logarithmic power spectrum determination unit, configured to determine a first logarithmic power spectrum corresponding to the to-be-evaluated signal and a second logarithmic power spectrum corresponding to the reference signal;

a first mute segment determination unit, configured to determine, in the first logarithmic power spectrum, a segment having a decibel value less than a preset threshold as a first mute segment;

a second mute segment determination unit, configured to determine, in the second logarithmic power spectrum, a segment having a decibel value less than the preset threshold as a second mute segment; and a mute segment removal unit, configured to remove the first mute segment from the to-be-evaluated signal and remove the second mute segment from the reference signal.

In addition, the apparatus for evaluating voice quality may further include a normalization module, configured to normalize the to-be-evaluated signal and the reference signal.

Further, the apparatus for evaluating voice quality may further include a power spectrum optimization unit module, configured to optimize the first power spectrum and the second power spectrum based on a masking effect.

Figure 10:
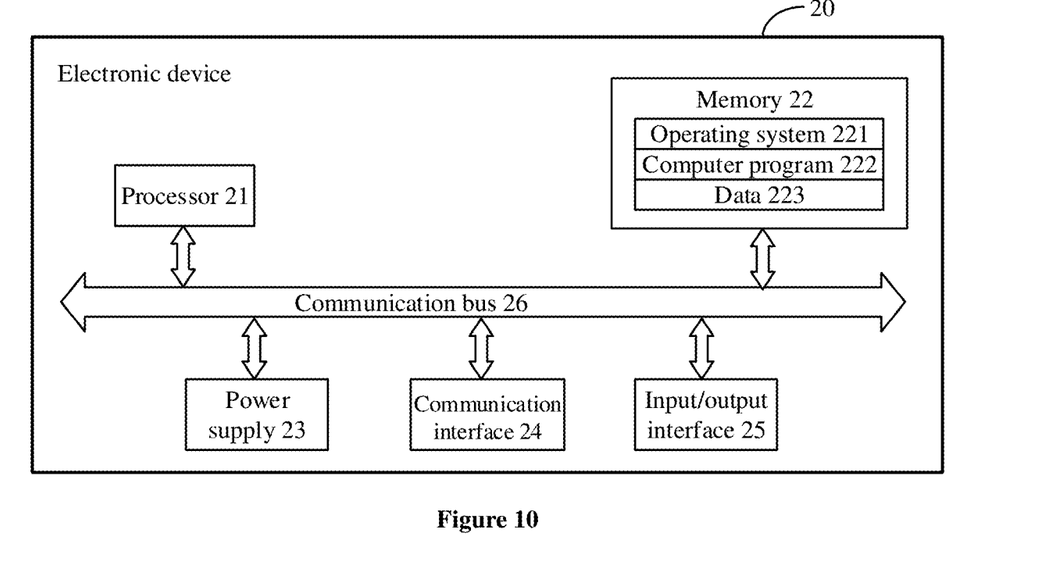
FIG. 10 is a structural diagram of an electronic device according to the present disclosure.

An electronic device is further provided according to the embodiment of the present disclosure. FIG. 10 is a structural diagram of an electronic device 20 according to an embodiment of the present disclosure, the content in which should not be considered as any limitation on the application scope of the present disclosure.

FIG. 10 is a schematic structural diagram of an electronic device 20 according to an embodiment of the present disclosure. The electronic device 20 may include: at least one processor 21, at least one memory 22, a power supply 23, a communication interface 24, an input/output interface 25 and a communication bus 26. The memory 22 is configured to store a computer program, and the computer program is loaded and executed by the processor 21 to implement relevant steps in the method for evaluating voice quality provided according to any one of the foregoing embodiments. In addition, as an example, the electronic device 20 in this embodiment may be a server.

In this embodiment, the power supply 23 is used to provide working voltage for hardware components of the electronic device 20. The communication interface 24 is capable of creating a data transmission channel between the electronic device 20 and external devices. The communication interface 24 uses a communication protocol applicable to the technical solution of the present disclosure, which is not specifically limited here. The input/output interface 25 is used to acquire input data from or output data to the external. The interface type of the input/output interface 25 can be selected according to actual requirements, which is not specifically limited here.

In addition, the memory 22, as a resource storage carrier, may be a read-only memory, a random access memory, a magnetic disk or an optical disk, etc., and the resources stored thereon may include an operating system 221, a computer program 222, and audio signal data 223, etc., and the storage may be temporary storage or permanent storage.

The operating system 221 is used to manage and control hardware devices and computer programs 222 on the electronic device 20, so as to realize the calculation and processing of the data 223 in the memory 22 by the processor 21. The operating system 221 may be Windows Server, Netware, Unix, Linux and the like. In addition to the computer program used to complete the method for evaluating voice quality as that implemented by the electronic device 20 and provided in any of the foregoing embodiments, the computer program 222 may further include a computer program used to complete other specific tasks. The data 223 may include various audio signal data collected by the electronic device 20.

Furthermore, a storage medium is provided according to an embodiment of the present disclosure, where a computer program is stored in the storage medium, and when the computer program is loaded and executed by a processor, the steps of the method for evaluating voice quality provided according to any of the foregoing embodiments are implemented.

Each embodiment in this specification is described in a progressive manner, the same and similar parts of each embodiment can be referred to each other, and each embodiment focuses on the differences from other embodiments. In particular, for the apparatus embodiments, since it corresponds to the method embodiments, the description is relatively simple and the related parts can refer to the part of the description of the method embodiment.

Finally, it should also be noted that in this context, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements to the process, method, article or device. Unless expressively limited, the statement "including a . . . " does not exclude the case that other similar elements may exist in the process, method, article or device other than enumerated elements.

Hereinabove the method, apparatus and device for evaluating voice quality according to the present disclosure are described in detail. Principles and implementations of the present disclosure are described by using specific embodiments. The description of the above embodiments is merely intended to help understand the method and the key concepts of the present disclosure. In addition, those skilled in the art can make variations in the specific implementation and the scope of application according to the concepts of the present disclosure. In summary, the content of this specification should not be understood as limitations on the present disclosure.

The invention claimed is:

1. A method for evaluating voice quality, comprising:
   recording a playback of a standard audio to obtain a to-be-evaluated signal;
   determining a first power spectrum of the to-be-evaluated signal on a critical frequency band to obtain a first spectrogram;
   determining a second power spectrum of a reference signal corresponding to the standard audio on a critical frequency band to obtain a second spectrogram, wherein the reference signal is a sampled signal corresponding to the standard audio;
   determining an image similarity between the first spectrogram and the second spectrogram, to obtain a voice quality score of the to-be-evaluated signal; and
   evaluating performance of a recording system of a voice collecting device based on the obtained voice quality score, and determining whether to replace the voice collecting device;
   wherein the first power spectrum and the second power spectrum are converted into a first logarithmic power spectrum and a second logarithmic power spectrum respectively, and images corresponding to the first logarithmic power spectrum and the second logarithmic power spectrum are generated respectively to obtain the first spectrogram and the second spectrogram.

2. The method for evaluating voice quality according to claim 1, wherein the determining the image similarity between the first spectrogram and the second spectrogram comprises:
   performing image enhancement on each of the first spectrogram and the second spectrogram, to obtain a first enhanced image corresponding to the first spectrogram and a second enhanced image corresponding to the second spectrogram; and
   determining an image similarity between the first enhanced image and the second enhanced image.

3. The method for evaluating voice quality according to claim 2, wherein
   the performing the image enhancement on each of the first spectrogram and the second spectrogram comprises:
   sharpening the first spectrogram and the second spectrogram; and
   the determining the image similarity between the first enhanced image and the second enhanced image comprises:
   calculating a cosine similarity between the first enhanced image and the second enhanced image.

4. The method for evaluating voice quality according to claim 2, wherein
   the performing the image enhancement on each of the first spectrogram and the second spectrogram comprises:
   performing edge detection on each of the first spectrogram and the second spectrogram; and
   the determining the image similarity between the first enhanced image and the second enhanced image comprises:
   calculating a Hamming distance or a cosine similarity between the first enhanced image and the second enhanced image.

5. The method for evaluating voice quality according to claim 1, wherein before the determining the first power spectrum of the to-be-evaluated signal on the critical frequency band to obtain the first spectrogram; determining the second power spectrum of the reference signal corresponding to the standard audio on the critical frequency band to obtain the second spectrogram, the method further comprises:
   removing mute segments from the to-be-evaluated signal and the reference signal.

6. The method for evaluating voice quality according to claim 5, wherein the removing the mute segments from the to-be-evaluated signal and the reference signal comprises:
   determining the first logarithmic power spectrum corresponding to the to-be-evaluated signal and the second logarithmic power spectrum corresponding to the reference signal;
   determining, in the first logarithmic power spectrum, a segment having a decibel value less than a preset threshold as a first mute segment;
   determining, in the second logarithmic power spectrum, a segment having a decibel value less than the preset threshold as a second mute segment; and
   removing the first mute segment from the to-be-evaluated signal and removing the second mute segment from the reference signal.

7. The method for evaluating voice quality according to claim 1, wherein after the recording the playback of the standard audio to obtain the to-be-evaluated signal, the method further comprises:
   normalizing the to-be-evaluated signal and the reference signal.

8. The method for evaluating voice quality according to claim 1, further comprising:
   optimizing the first power spectrum and the second power spectrum based on a masking effect.

9. An electronic device, comprising:
   a memory, configured to store a computer program; and
   a processor, configured to execute the computer program, to perform the method for evaluating voice quality according to claim 1.

\* \* \* \* \*